(12) United States Patent
Horn

(10) Patent No.: US 10,356,198 B2
(45) Date of Patent: Jul. 16, 2019

(54) DATA TRANSMISSION BETWEEN AT LEAST ONE SAFE PRODUCER AND AT LEAST ONE SAFE CONSUMER

(71) Applicant: Phoenix Contact GmbH & Co. KG, Blomberg (DE)

(72) Inventor: Steffen Horn, Blomberg (DE)

(73) Assignee: Phoenix Contact GmbH & Co. KG, Blomberg (DE)

(*) Notice: Subject to any disclaimer, the term of this patent is extended or adjusted under 35 U.S.C. 154(b) by 211 days.

(21) Appl. No.: 15/508,451

(22) PCT Filed: Sep. 3, 2015

(86) PCT No.: PCT/EP2015/070156
§ 371 (c)(1),
(2) Date: Mar. 2, 2017

(87) PCT Pub. No.: WO2016/034676
PCT Pub. Date: Mar. 10, 2016

(65) Prior Publication Data
US 2017/0295255 A1 Oct. 12, 2017

(30) Foreign Application Priority Data
Sep. 3, 2014 (DE) .................... 10 2014 112 704

(51) Int. Cl.
*H04L 29/08* (2006.01)
*H04L 29/06* (2006.01)
(Continued)

(52) U.S. Cl.
CPC ........ *H04L 67/2842* (2013.01); *G06F 3/0604* (2013.01); *G06F 3/067* (2013.01);
(Continued)

(58) Field of Classification Search
CPC ... H04L 29/08072; H04L 29/06; G06Q 30/02; G06Q 30/0241
(Continued)

(56) References Cited

U.S. PATENT DOCUMENTS 8,549,136 B2 10/2013 Kalhoff et al.
9,256,477 B2 * 2/2016 Truong ................... G06F 9/524
(Continued)

FOREIGN PATENT DOCUMENTS

DE 103 53 950 A1 6/2005
EP 1 188 096 B2 3/2002
(Continued)

OTHER PUBLICATIONS

International Search Report issued in connection with corresponding International Application No. PCT/EP2015/070156 dated Nov. 24, 2015 (4 pages total).
(Continued)

*Primary Examiner* — Khanh Q Dinh
(74) *Attorney, Agent, or Firm* — John Maldjian; Maldjian Law Group LLC

(57) ABSTRACT

Data transmission between a safe producer and a safe consumer, wherein the safe producer is a network subscriber connected to a first network infrastructure, and the safe receiver is a network subscriber connected to one of the first network infrastructure and a second network infrastructure. Embodiments include generation of secure data for a safe consumer by the safe producer, write access to a data memory and writing the generated secure data, to be identifiable as such, to the data memory. Embodiments also may include consumption of secure data from a safe producer by a safe consumers, wherein a data memory is read accessed, to which data intended for safe consumers had been written to be identifiable as secure data, and wherein the data written (Continued)

to be identifiable as data intended for the safe consumer are read.

19 Claims, 4 Drawing Sheets

(51) Int. Cl.
*G06F 3/06* (2006.01)
*G06F 11/10* (2006.01)
*H04L 1/00* (2006.01)
*H04L 29/12* (2006.01)

(52) U.S. Cl.
CPC ........ *G06F 3/0659* (2013.01); *G06F 11/1004* (2013.01); *H04L 1/0041* (2013.01); *H04L 1/0045* (2013.01); *H04L 63/0272* (2013.01); *H04L 63/04* (2013.01); *H04L 63/10* (2013.01); *H04L 1/00* (2013.01); *H04L 1/0061* (2013.01); *H04L 61/2007* (2013.01); *H04L 61/2038* (2013.01); *H04L 67/10* (2013.01)

(58) Field of Classification Search
USPC .......................................... 709/220, 224, 228
See application file for complete search history.

(56) References Cited

U.S. PATENT DOCUMENTS

| | | | | |
|---|---|---|---|---|
| 9,304,702 | B2* | 4/2016 | Truong | G06F 3/0626 |
| 9,477,521 | B2* | 10/2016 | Truong | G06F 9/4887 |
| 2002/0126620 | A1 | 9/2002 | Heckel et al. | |
| 2005/0149207 | A1 | 7/2005 | Esch et al. | |
| 2008/0082355 | A1* | 4/2008 | Leach | G06Q 30/08 |
| | | | | 705/310 |
| 2008/0097827 | A1* | 4/2008 | Leach | G06Q 10/06315 |
| | | | | 705/7.25 |
| 2008/0109297 | A1* | 5/2008 | Leach | G06Q 10/02 |
| | | | | 705/7.31 |
| 2008/0109345 | A1* | 5/2008 | Leach | G06Q 30/02 |
| | | | | 705/37 |
| 2015/0046265 | A1* | 2/2015 | Bulger | G06Q 30/0269 |
| | | | | 705/14.66 |
| 2015/0193828 | A1* | 7/2015 | Bulger | G06Q 30/0269 |
| | | | | 705/14.66 |

FOREIGN PATENT DOCUMENTS

| | | |
|---|---|---|
| EP | 2 053 476 A2 | 4/2009 |
| JP | 2013-196058 A | 9/2013 |
| JP | 5448128 B1 | 3/2014 |

OTHER PUBLICATIONS

Erel Geron et al: "CRUST: Cryptographic Remote Untrusted Storage without Public Keys", Sep. 30, 2007 (Sep. 30, 2007), pp. 1-24, XP031165343, ISBN: 978-0-7695-3052-9 (32 pages total).
Information Sciences Institute University of Southern California: "Transmission Control Protocol DARPA Internet Program Protocol Specification"; rfc793.txt, URL: http://wftp3.itu.int/av-arch/jctvc-site/, Sep. 30, 1981 (Sep. 30, 1981), XP015006775 (92 pages total).
Watson M Luby L Vicisano Digital Fountain M: "Forward Error Correction (FEC) Building Block; rfc5052.txt", URL: http://wftp3.itu.int/av-arch/jctvc-site/, Internet Engineering Task Force, IETF, CH, Aug. 31, 2007 (Aug. 31, 2007), XP015055124 (26 pages total).
Goh E et al., "SiRiUS: Securing Remote Untrusted Storage", Proceedings of the Internet Society (!SOC) Network and Distributed Systems Security (NOSS) Symposium, vol. 10th conf Feb. 6, 2003 (15 pages total).
Anonymous: "Ethernet—Wikipedia", Aug. 12, 2014 (Aug. 12, 2014), XP055324558, URL:https://de.wikipedia.org/w/index.php?title=Ethernet&oldid=133006995; in English at: https://en.wikipedia.org/wiki/Ethernet (12 pages total).
International Preliminary Report on Patentability for International Application No. PCT/EP2015/070156, dated Mar. 9, 2017, 10 Pages.

* cited by examiner

DATA TRANSMISSION BETWEEN AT LEAST ONE SAFE PRODUCER AND AT LEAST ONE SAFE CONSUMER

CROSS-REFERENCE TO RELATED APPLICATIONS

This application claims the benefit under 35 U.S.C. § 371 of International Application No. PCT/EP2015/070156 filed on Sep. 3, 2015, which in turn claims the benefit of German application 102014 112 704.8 filed on Sep. 3, 2014, the entire content of each of which is hereby incorporated by reference in its entirety.

FIELD

In order to reduce the risk for humans or the environment in automated processes, machines and systems must realize safety functions such as, e.g., the turning off of a machine after pressing an emergency stop key or the shifting of the system into the safe state after recognition of an error. Error-safe automating systems are being increasingly used to this end. In general, these error-safe automating systems realize on the one hand the actual safety function (such as, e.g., emergency stop, two-hand switching, selection switch for the operating mode, . . . ) and on the other hand measures which recognize and control errors according to, e.g., mechanisms set in standards (IEC 61508, IS013849, . . . ) and which correspond to the current state of the art.

In particular, the standard series IEC 61508 concerning safety furthermore comprises in this regard the using of various methods for controlling errors such as, e.g., the avoiding of systematic errors in the development, the monitoring in a running operation for recognizing random errors and the safe controlling of recognized errors (also designated in the following and in the claims as error-safe), and consequently the passage into a state which was previously defined as safe. All these measures can be a part of certain, previously set safety functions. It can be stated in general that double-channel or multichannel systems in which each channel can initiate a safety function by itself can achieve a higher degree of safety or a higher safety level (English: Safety Integrity Level, "SIL") than those which have only one channel. The flow of information through a safety chain (safety loop) is designated as a channel, starting, e.g., from the requirement of a safety function (e.g., by a sensor, approximation indicator, light barrier or feeler) and ending with the actor or final control element, which introduces the safe state of a machine.

Accordingly, electrical safety does not belong to this safety in the scope of the invention.

BACKGROUND

In current machines and systems communication systems such as, e.g., Ethernet-based networks or field busses are used dependent of the extent of the systems and on the degree of automatization and which connect the decentral I/O devices (input-output devices such as, e.g., sensors and/or actors) and controls. For the transmission of safety-relevant data, safe communication protocols are used as a rule.

Therefore, if it is ensured by suitable measures that a certain safety function is effectively met by a system but also by an individual subscriber such as, e.g., a server, control, I/O devices up to and including an individual hardware and/or software component, this system and/or the individual subscriber or the particular component is considered in the framework of the following specification and of the claims as safe or directed toward safety. If there are no safety-related or safety directed requirements for a system but also for an individual subscriber or for an individual component and if the meeting of a certain safety function is not ensured by suitable measures for the system or the subscriber or the component, this system, the particular subscriber or the particular component is considered as not safe in the framework of the following specification and of the claims.

The concept "safe" or "safety" accordingly concerns in the framework of the invention and in the specification and the claims, unless otherwise indicated, the functional safety. From the aforementioned therefore, is to be delimited e.g., an electrical safety/security or a secure communication channel in which the security in this connection consists in that the communication channel is secured against unauthorized accesses, or secure data in which the security in this connection consists in that the data is secured against unauthorized reading safe.

Safe network protocols are standardized today, e.g., in the IEC 61784-3. It describes different safety profiles based on principles of a safe network communication. All these network protocols must control the different error models such as, e.g., a mixing of safe and unsafe data and/or telegrams and/or a falsification, loss, delay, exchange, repetition, insertion, and so forth of data and/or telegrams. They define error-recognizing and error-controlling measures with knowledge of the standard network protocol supporting them, e.g., according to fieldbus-based or Ethernet-based communication standards and the error models possible in these networks. The so-called "black channel principle" is frequently used for this. In it, a safety protocol is customarily integrated between a safe use and a "non-safe" standard communication channel which protocol corresponds to the safe level of a safe-directed system and recognizes and controls transmission errors of the communication layers underneath them. That is, the "non-safe" transmission channel is constantly monitored for its integrity by a superposed "safe" protocol. The standardized safe protocols share the fact that they describe the safe communication within a clearly defined and delimited, closed network space. Therefore, there are, e.g., restrictions on the number and the distribution of the standards of the safe network subscribers.

SUMMARY

In the GS-ET-26 "Bases for the Checking and Certification of Bus Systems for the Transmission of Safety-related Messages", edition 3-2014, the "DGUV Test, Checking and Certification Section for Electrotechnology" also describes, in addition to the requirements and the testing criteria, four different architectural models of bus/network systems. The architectural models described in it start in the safety-related communication from a message source and a message trap and different solely in the arrangement of the redundancies required for certain safety levels. However, this basically always concerns a point-to-point relationship of the safe communication.

EP 1 188 096 describes a control system for controlling safe-critical processes. Here, a network master and safe-related signal units which are connected to the safe-critical process to be controlled within a network are connected via a field bus. Furthermore, a safe control is provided in the network for controlling the safe-critical process, which is also arranged on the field but set off from the network master. Therefore, all safety subscribers are connected via a common fieldbus to the same network and can exchange safe telegrams with each other. Each safe subscriber contains a protocol chip to this end which is connected by a first bus connection on the input side and by a second bus connection on the output side to the fieldbus so that the safety subscribers can exchange data/information to be transmitted with each other by appropriate access to the fieldbus. The structure of the network must be known to the safety control and it must especially know at which location of the fieldbus a safety-related signal unit addressed by it is arranged. Data/information from into the network master must furthermore be converted by the safety control.

DE 103 53 950 A1 describes a control system in which, in contrast to EP 1 188 096, the safety control is connected to a network master in a network that is independent of the fieldbus or not via the fieldbus. Accordingly, the safety control at first generates a safety-directed protocol and transmits it to the network master. The communication on the fieldbus is subsequently developed in particular in such a manner that the safety-related protocol is inserted directly and/or without its own safety-relevant functionality as useful data into the fieldbus telegrams and transmitted to the safe signal units.

EP 2 053 476 A2 describes a system for operating at least one non-safety-critical process and at least one safety-critical process. Here, in addition to a network master device a separate safety control is provided which is constructed as regards the component required for the safety-critical application process as a safety-related server device. This device processes the safety-relevant data necessary for the controlling of the safety-critical application process and organizes the transmission of the safety-relevant data with the aid of an associating device. The associating device is provided with functional units via which it receives information about all network elements, at least about the network elements necessary for the safety-critical process and their necessary component relationships with each other or automatically determines this information by cooperating with a network master device. Based on this, the associating device initializes the network master device, upon which the latter operates the network in such a manner that, based on the standard component, a superposed safety communication is made possible between safety-relevant network subscribers such as, e.g., several point-to-point relationships between the safety control and the safe I/O devices. With the aid of such an associating device the telegrams to be transmitted for the communication between the safety-relevant network subscribers can therefore be actively routed without the safety control having to know the structure of the entire network since a quasi superposed safety-relevant network structure is built up which is operated by the standard network using the operating means and access rules made available from the communication master.

All previously cited publications of the prior art therefore concern the communication between safety-relevant devices and safety protocols in closed networks.

Furthermore, the "safety bridge system" of the applicant developed by the applicant and certified since 2009 uses non-safe network masters and/or a non-safe standard control within the data path between safe logic modules and the safe devices, so-called satellites, associated with them as non-safe routers of the safe telegrams. Therefore, the safety functions are processed directly in the safe subscribers so that a safety device and a safe fieldbus system can develop. Here, in an embodiment special functional components finally copy the telegrams from one safe subscriber to another one, as a result of which a point-to-point relationship is created. For this routing process a non-safe network master and/or a non-safe standard control must recognize and administrate the addresses of the connected, safe subscribers. A certain additional expense for configuration and parameterizing is produced as a result. In addition, the routing within the non-safe device, i.e., in this case the non-safe network master and/or the non-safe standard control, also signifies a certain expense for the performance by the active, cyclic copying of the data (telegrams). The non-safe device as router of the safe messages therefore engages actively into the data flow by communication technology.

Today's time is stamped by Cyper Physical Systems (CPS), Distribution of Intelligences, and Internet of Things (TOT). The migration of Internet technologies into the automation technology is described under Industry 4.0. The complete horizontal and vertical linking of intelligent devices (sensor devices, control logic, actor devices) is the prerequisite for modularization (i.e., for a modularized construction up to entire systems which is composed of standardized individual components along defined positions, optionally including program interfaces, reuse and the adaptability of machine modules. The safety-relevant linkage of several machine- or system parts plays a greater and greater part in the above. At the same time, previously less relevant component protocols are becoming more and more significant for the automating technology. Previous communication mechanisms such as master/slave are supplemented by producer/consumer or client/server.

Internet technologies such as cloud services currently still play a subordinate part in the area of automation. A significant rise in the importance of IT services for the automation technology is to be reckoned with.

One problem of the invention is to indicate a simple path with which a safe communication can be ensured in open networks and structures independently of master/slave, client/server and producer/consumer architectures, in particular using IT (Information Technologies) and their standard structural components.

The problem of the invention is solved by a method and a network system according to the attached independent claims. Advantageous and purposeful further developments constitute subject matter of the particular subclaims.

Accordingly, the invention suggests a method for operating a data transmission between at least one safe producer of safe data and between a safe consumer of safe data, wherein the safe producer is a network subscriber that is connected to a first network infrastructure and the safe consumer is a network subscriber that can be connected to the first network infrastructure or to a second network infrastructure. Here, the generation of safety data is provided at first by the at least one safe producer of data, and subsequently the writing access to a data memory as well as the writing of this generated data, which can be identified as such, into the data memory. As a supplement or alternative, it is provided in the at least one safe consumer of data that the consumption of safe data of at least one safe producer by at least one of these safe consumers is accessed at least by reading, in which certain data which can be identified as such is written for this at least one of these safe consumers. The data which is written in the data memory is data determined for this at least one safe consumer and is then read out by this at least one safe consumer.

Therefore, since the producer in the consumer are set up and designed so that the functions of the generation and consumption are effectively met even for the entire data transmission as a safety function, it is therefore consequently possible with the invention to temporarily store safety telegrams (e.g., messages or notices) on non-safe data memories including on data memories of non-servers and to nevertheless ensure that a safe communication and therefore a safe data transmission is effectively met between a safe producer and the safe consumer.

According to preferred embodiments which are described in more detail in the following, a safety-relevant communication is established between the producer of data and the consumer of data according to the invention, therefore in particular by the steps of sending a safety telegram from the safe producer to a standard data server, of storing the safety telegram on this data server and of reading out the safety telegram by at least one safe consumer, wherein the safety telegram advantageously contains additional information from the safe producer with which the safe consumer can determine and check in an error-safe manner the data integrity, the "origin", e.g., by safe (optionally worldwide unambiguous) identification of the producer, and/or the age of the data, e.g., by a safe time stamp.

Furthermore, in particular for the practical realization of this method the invention suggests a network system for data transmission between at least one safe producer of data and at least one safe consumer of data, wherein at least one of these safe producers is arranged for generating data for at least one of these safe consumers, and at least one of these safe consumers is arranged for safely consuming data from at least one of these safe producers. The safe producer is a network subscriber here that is connected to a first network infrastructure and the safe consumer is a network subscriber that can be connected to the first network infrastructure or to a second network infrastructure. Furthermore, the network system comprises a data memory to which data can be written and from which data can be read, as well as advantageously at least one first coupling unit and at least one second coupling unit, each with at least one interface, at least one of these safe producers which is arranged to generate data for at least one of these safe consumers, is connected to such a first coupling unit and which first coupling unit is arranged and designed so that a write-access connection can be constructed by its interface to the data memory, and that data generated by this safe producer can be written into the data memory which can be identified as such. At least one of the safe consumers, which is arranged for safely consuming data from at least one of these safe producers is connected to such a second coupling unit and this second coupling unit is arranged and designed to build up a reading access connection by means of the interface and to read out data from this data memory which was written in an identifiable manner to this data memory as data determined for this safe consumer.

Consequently, a safe communication can also take place beyond, in particular also currently still existing limits of closed networks, in particular also via WEB-based mechanisms. This also opens up in particular an extremely flexible combination of cooperating system components at substantially any decentral locations, which consequently also substantially increases the possibility and ability of adaptive, safe systems, including machines and their modules.

Furthermore, in especially preferred embodiments in which no set producer-consumer associations, in particular including sender-receiver associations of safety telegrams exist any longer but rather solely producers of safety-relevant data whose generated safety-relevant or safe data is then sent and filed by first coupling units in telegrams to data memories, in particular also to non-safe data memories, e.g., also from non-safe servers, and consumers of safety-relevant data which is read out for these consumers from these data memories by second coupling units, an extremely flexible docking and undocking of modular system parts, including machine parts and their module parts, is made possible since no connection-oriented communication relationships are necessary any longer or there are also no such connection-oriented communication relationships.

BRIEF DESCRIPTION OF THE DRAWINGS

These advantages and other advantages and features of the invention are also apparent from the following description of a few exemplary embodiments with reference made to the attached drawings, wherein it is understood that these features can be used not only in the particular described combination but also in other combinations or by themselves alone without using the framework and without departing from the framework of the invention. In the figures.

DETAILED DESCRIPTION

Figure 1:
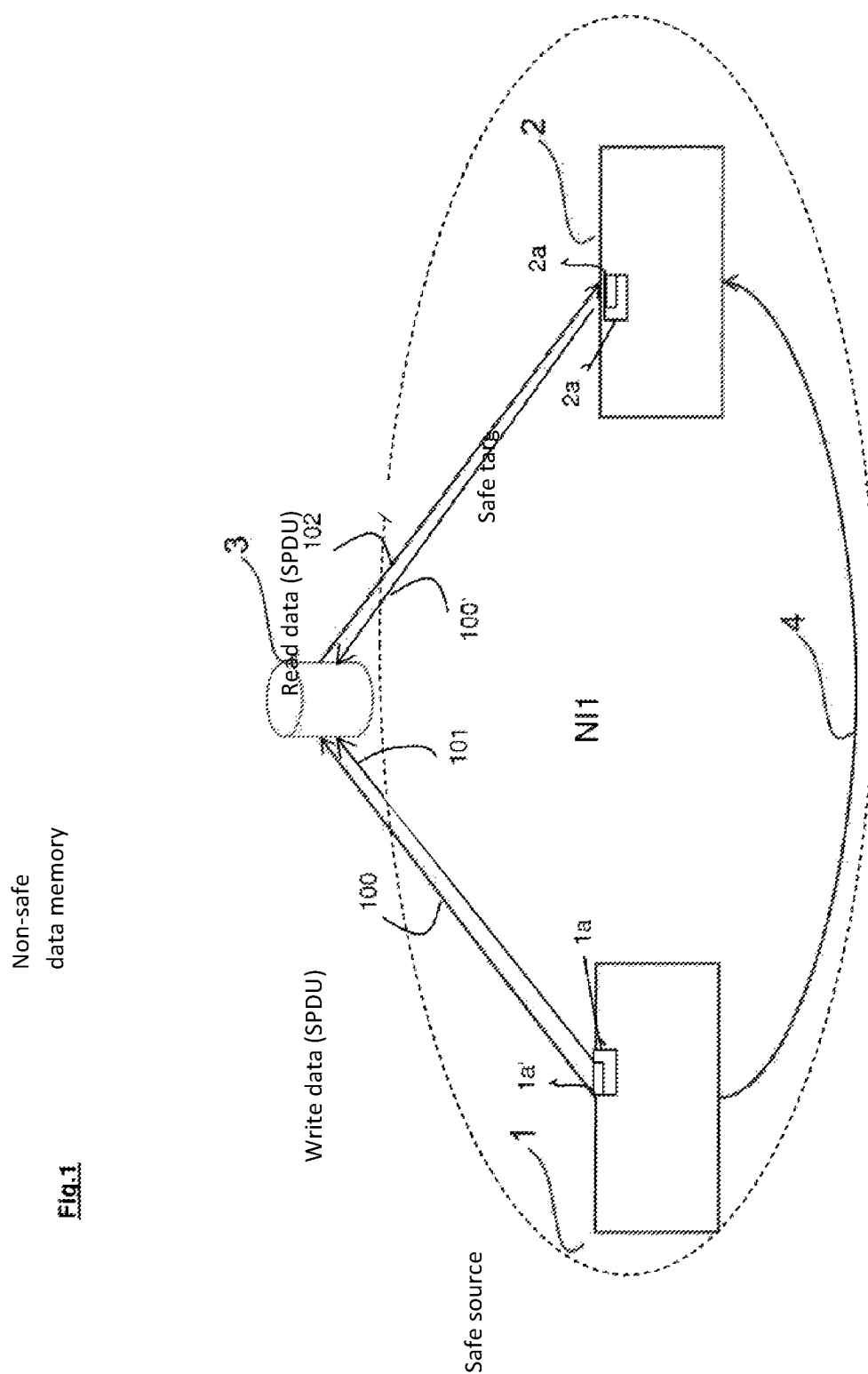
FIG. 1 shows a greatly simplified basic image of a safe communication according to the invention via a data memory.

All figures show greatly simplified and/or schematically not-to-scale views. Similar or identical elements are designated as a rule in the figures with the same reference numerals.

The views of safe communications according to the invention and shown in the figures are at first exemplary embodiments for illustrating methods according to the invention for operating a data transmission between at least one safe producer of safe data and at least one safe consumer of safe data, wherein the safe producer is a network subscriber that is connected to a first network infrastructure and the safe consumer is a network subscriber that can be connected to the first network infrastructure or to a second network infrastructure. A safe producer of safe data is in FIG. 1 e.g., a safe transmitter designated by the reference numeral 1 as "safe source" and in FIG. 2 a safe transmitter is characterized by the reference numeral 13, and a safe consumer of safe data is in FIG. 1 e.g., a safe receiver designated by the reference numeral 2 as a "safe target" and in FIG. 2 a safe receiver characterized by the reference numeral 23.

After the generation of safe data by the safe transmitter 1 or 13 as a safe producer of safe data for at least one receiver 2 or 23 provided as a safe consumer, a data memory 3 is accessed during the step of a transmission during the data transmission of the generated, safe data between this producer and this consumer which access is at least written 100, and this data is written in 101 identifiable as such into the data memory 3. And or for the consumption of safe data of the safe transmitter 1 or 13 by the safe receiver 2 or 23 the data memory 3 is accessed again, namely at least read accessed 100', and advantageously cyclically accessed during the step of a receiving during the data transmission of the generated, safe data between this producer and this consumer in which certain data identifiable as such can be written into the data memory for the safe consumer, that is, for the safe receiver 2 (FIG. 1) and 23 (FIG. 2), and the data which is written in it as certain identifiable data for the safe consumer is read out 102. As a result of the fact that the generated, safe data is written in by the producer identifiable as such in the data memory and is consequently identifiable for the safe consumer as data intended for it, the data can be consequently purposefully read out or retrieved identifiable as such without this data having to be actively routed by the data memory 3.

Figure 2:
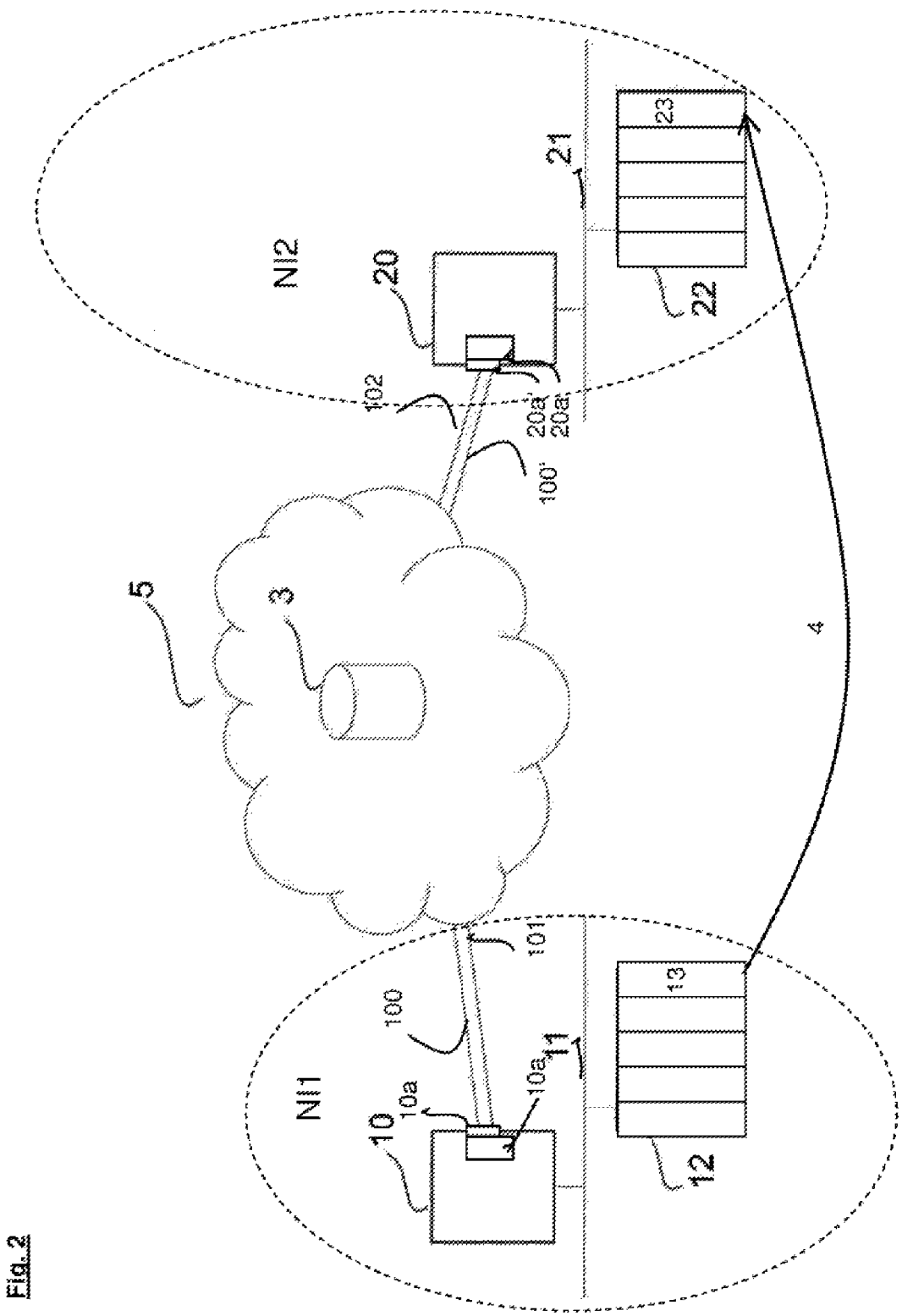
FIG. 2 shows a schematic view of a safe communication according to the invention between two safety devices of separate network infrastructures, which devices are set up as a safe producer and as a safe consumer via another network infrastructure, in particular the Internet, and in particular a cloud-computing infrastructure.

According to the invention the network systems, which are, for example, greatly simplified in the FIGS. 1 and 2, are sketched for reasons of clarity only in sections and are for the transmission of data between the safe transmitter 1 and 13 as a safe producer of safe data and the safe receivers 2 and 23 as a safe consumer of safe data, comprise in addition to the data memory 3, to which data can be written and from which data can be read out, at least a first coupling unit 1a and 10a and at least a second coupling unit 2a and 20a each with at least one interface 1a' and 10a' and 2a' and 20a'. The safe transmitter 1 and 13 as a safe producer of safe data is a network subscriber which is connected to a first network infrastructure NI1 and the safe receiver 2 and 23 as a safe consumer of safe data is a network subscriber which can be coupled to the first network infrastructure NI1 or to a second network infrastructure NI2. In FIG. 1, e.g., a common first network infrastructure NI1 is indicated to which even the data memory 3 can belong but does not have to belong. In FIG. 2, e.g., two different, a first and a second network infrastructures NI1 and NI2 are indicated which have a local bus 11 and 21.

Here, in a network system for the transmission of data between at least one safe producer of data and at least one safe consumer of data, at least one safe producer is therefore arranged for safely generating data for at least one safe consumer, and at least one safe consumer is arranged for safely consuming data from at least one of these safe producers. Therefore, based on FIG. 1, the safe transmitter 1 is arranged, for example, to safely generate data for the safe receiver 2 and also to send it to the latter in a practical conversion. The safe receiver 2 is therefore preferably arranged to safely consume data from the safe transmitter 1 and to also appropriately receive it in a practical conversion. Based on FIG. 2, the safe transmitter 13 is arranged, for example, to safely generate data for the safe receiver 23 and to also transmit it to the latter in a practical conversion. Therefore, the safe receiver 20 is preferably arranged to safely consume data from the safe transmitter 13 and to also appropriately receive it in a practical conversion.

In the framework of the invention at least one of the safe producers which is arranged for generating data for at least one safe consumer is connected to a previously mentioned first coupling unit, wherein this first coupling unit is arranged and designed to write data produced by the safe producer into the data memory 3 which can be identified as such in the data memory 3 101 by means of its interface by constructing at least one write access connection 100. Consequently, based on the FIGS. 1 and 2, the first coupling unit 1a, 10a is connected to the safe transmitter 1 and 13 and is arranged and designed to write data transmitted to the data memory 3 from the safe transmitter 1 and 10 into the data memory 3 which can be identified as such 101 by the interface 1a' and 10a' by constructing at least one connection to the write access 100, i.e., to the write access connection.

Furthermore, in the framework of the invention at least one of the safe consumers which is arranged for safely consuming data from at least one of the safe producers is connected to a previously cited second coupling unit, wherein this second coupling unit is arranged and designed to read 102 data from data memory 3 and from the safe producer which was written into this data memory as identifiable data determined for this safe consumer by its interface by constructing at least one read access connection 100' to the data memory 3.

Therefore, based on FIGS. 1 and 2, the second coupling unit 2a, 20a is connected to the safe receiver 2 or 20 and is arranged and designed by the first interface 2a' and 20a' by constructing at least one access connection to the read access 100', i.e. the read access connection to the data memory 3 to read out data 102 of the safe transmitter 1 and 10 from the latter which was written into it as identifiable data determined for the safe receiver.

As a result of the fact that the generated, safe data is written by the producer identified as such in the data memory and subsequently for the safe consumer as data intended for it, the data can consequently be read out and/or retrieved identifiable as such in a purposeful manner without this data having to be actively routed in the data memory 3.

If, in a further development but not shown in the figures for reasons of clarity, a safe producer, e.g., the transmitter 1 is also arranged as a safe consumer and/or a safe consumer, e.g., the safe receiver 13 is also arranged as a safe producer, then instead of one coupling unit two coupling units can be appropriately provided, one for reading and one for writing, or one coupling unit can be provided which is then arranged, however, e.g., for establishing a connection with the read-write access, i.e., an access connection via which writing as well as reading are possible.

Furthermore, as can be seen in the FIGS. 1 and 2, in an alternative embodiment the first coupling unit can be a unit of the safe producer (FIG. 1) or of a first other network subscriber 10 (FIG. 2) which is connected to the first network infrastructure. Even the second coupling unit can be a unit of the safe consumer (FIG. 1) or of a second other network subscriber 20 (FIG. 2) which is also connected to the network infrastructure of the safe consumer. Note that depending of the construction of the network system the one coupling unit can be a unit of the safe producer or safe consumer and the other coupling unit can be a unit of another network subscriber. In the framework of the invention the coupling units can be designed in hardware and/or software and especially preferably as so-called embedded devices.

Even the data memory 3 can be connected, depending of the construction of the network system, to the first network infrastructure NI2, to the second network infrastructure NI2 or to a third network infrastructure. FIG. 2 shows, e.g., an embodiment in which the data memory 3 is connected to a third network infrastructure, in particular to the Internet, and in particular is part of a cloud computing infrastructure 5.

Network subscribers in a common network infrastructure can advantageously transmit data according to a predefined communication protocol so that in this regard, depending on the network infrastructure, even protocols already used for the application of the invention do not have to be changed.

In order to effectively meet the functions of the generating of safe data and of the consumption of safe data even via the entire data transmission as a safety function, i.e. to temporarily store a safe communication or a safe data transmission between a safe transmitter and a safe receiver, and safety telegrams on non-safe data memories, including on data memories of non-safe servers without having to employ separate, safety-relevant requirements regarding error recognition, configuration and runtime qualities, it is preferably provided that the safe producer, e.g., the safe transmitter 1, 13 and the safe consumer, e.g., the safe receiver 2, 23 are arranged and constructed for the safe transmission of safe data to be transferred between the safe producer and the safe consumer for using a common predefined safety protocol, in particular a safety protocol which, independently of the using of particular communication protocols between network subscribers, is superposed or can be superposed over these communication protocols. Therefore, to this end a person skilled in the art can select, depending on the specific application, a suitable one from a plurality of known communication protocols and can also correspondingly arrange and design the safe sender 1 or 13 as a safe producer in the safe receiver 2 or 23 as a safe consumer in the framework of the invention.

The safely generated and safely consumed data to therefore be transmitted in the framework of the invention can therefore furthermore also be safety-relevant data.

In an advantageous and preferred embodiment of a network system according to the invention all safety mechanisms for converting error-recognizing measures and advantageously also safeguarding measures against errors regarding data which is to be transmitted between the safe producer, e.g., the safe transmitter 1 or 13 and the safe consumer, e.g., the safe receiver 2 or 23 is present exclusively in the safe producer and the safe consumer. This is in particular the case if a bidirectional, safe communication relationship is given or should be given, i.e., that even the safe producer is capable of or is arranged to be able to carry out evaluations of the transmission of the safe data and to optionally also initiate associated error-safe reactions.

In another especially advantageous and especially preferred embodiment of a network system according to the invention at least the conversion of error-recognizing measures and advantageously also of safeguarding measures against errors takes place regarding data which is to be transmitted between the safe producer, e.g., the safe transmitter 1 and 13 and the safe consumer, e.g., the safe receiver 2 and 23 exclusively in the safe consumer present. This is especially the case if no or at least quasi no bidirectional, safe communication relationship is given or should be, i.e. that only the safe consumer is capable or is arranged to this end to be able to carry out evaluations of the transmission of the safe data and optionally also to initiate associated error-safe reactions.

In this case no error-recognizing safety mechanisms must be present in the safe producer but rather it supports the error-recognizing measures of the consumer preferably only by the error-safe generation of information possibly required for the error recognition.

Furthermore, depending of the specific use, at least one predetermined identification information is filed on the one hand in the safe producer, which is arranged for generating data for at least one of these safe consumers, e.g., the safe transmitter 1 or 13, and/or in the first coupling unit connected to the latter, e.g., the coupling unit 1a or 10a, and on the other hand in the safe consumer, which is arranged to safely consume data from at least one of these safe producers, e.g., the safe receiver 2 or 23, and/or in the second coupling unit connected to the latter, e.g., the coupling unit 2a or 20a of a network system according to the invention, which identification information is arranged and designed to carry out at least the writing and reading using this at least one identification information.

Such identification information can be, e.g., address information of the safe producer, of the safe consumer and/or of a certain storage range of the data memory in which data to be transmitted between at least one safe producer and at least one safe consumer can be written and/or read.

In particular, this can result in a very simple manner, depending on the application of the method of the invention and/or the use of the network system according to the invention, in a first embodiment in a safer producer which is arranged for producing data for at least one of the safe consumers, and is advantageously arranged in such a manner as to safely generate data for at least one certain, safe consumer and/or the first coupling unit connected to this safer producer is advantageously arranged for writing data for at least one certain, safer consumer into the data memory. To this end, e.g., address information can be used which identifies the certain, safer consumer and/or a certain memory range of the data memory.

Furthermore, in particular as a consequence of the above, in a second, supplementary or alternative embodiment a safer producer which is arranged for generating data for at least one of these safe consumers, is advantageously arranged in such a manner as to generate data independently of a certain, safe consumer and/or the first coupling unit connected to the latter is advantageously arranged to write data independently of a certain, safe consumer in the data memory. To this end, e.g., address information can be used which identifies the safe producer and/or a certain memory range of the data memory.

Furthermore, in particular as a consequence of the above, in another supplementary or alternative embodiment a safe consumer, which is arranged for safely consuming data from at least one of the safe producers, can advantageously be arranged in such a manner for consuming data from a certain, safe producer and/or the second coupling unit connected to this consumer can advantageously be arranged for reading data from a certain, safe producer. To this end, e.g., address information can be used which identifies the safe producer and/or a certain memory range of the data memory.

In the framework of the invention the data flow therefore does not run between a safe producer and a safe consumer via a point-to-point connection or via an active routing/copying mechanism. Rather, the data transfer between a safe producer and a safe consumer takes place indirectly via a data memory which can also be in particular part of a server and optionally using cloud technologies. Furthermore, this data memory and/or server can advantageously also be non-safe.

Furthermore, in the framework of the invention safe data from the producer can consequently be generated at first independently of the state of the consumer and therefore in especially preferred embodiments also independently of the presence of a consumer and/or also independently of the number of consumers and/or be subsequently written into a data memory. Furthermore, the written, safe data can therefore be retrieved from the data memory and consumed even preferably independently of the state of a producer by the consumer, especially also by several consumers advantageously at any time and preferably cyclically.

The safe data can be here, as previously described, in particular inside a safe communication or of a safe telegram and in particular using a suitably selected safety protocol.

Therefore, all data for the unambiguous identification of the communication path during the data transmission of safe data between a safe producer and a safe consumer of data can also be only a component of a safe telegram, depending on the specific construction. In the latter case, therefore in particular when the first and the second coupling units are part of the safe producer and of the safe consumer, consequently in embodiments in which a bidirectional, safe communication relationship is still present, only the safe producer and the safe consumer must recognize at least a correspondingly unambiguous piece of identification information.

In the especially preferred embodiments in which de facto no bidirectional, safe communication relationship exists anymore between a producer and a consumer but rather producers safely generate safety-relevant data without knowledge of and independently of whether this data is consumed, this safely generated data can then, e.g., be sent to a data memory, in particular to a non-safe one and written there based solely on information which identifies a certain memory range of a certain data memory. As is apparent to a person skilled in the art, this information can again, depending on the specific formation, also be a component of or also only be a component of such a safe telegram. Therefore, the data memory serves here quasi as a type of "remote" data depository for such a producer. Therefore, the latter also requires no response in this case from a potential consumer of this safe data and/or of a safe telegram comprising it. Therefore, in particular in this case no safety-relevant evaluations of the success/failure of the sending of the safety telegram and of error-safe reactions connected to them can be carried out in the producer. In other words, it makes no difference to the safe producer whether the data and/or the telegram was falsified or replaced or delayed underway to any consumer or whether it has other errors corresponding to the previously discussed error model. Therefore, in this case all measures for the recognition of transmission errors from a safe producer to a safe consumer are converted exclusively in the safe consumer, in particular also any error-safe reaction to recognized transmission errors. As was previously already addressed, the producer advantageously supports, however, the error-recognizing measures of the consumer at least by the error-safe generation of additional information suitable and necessary for the recognition of errors such as, e.g., safe (optionally unambiguous worldwide) identification of the producer, safe time stamp, safe continuous numbers and/or safe CRC's.

The data memory/server itself can again preferably advantageously support the reading and writing accesses. However, it does not route actively itself.

Therefore, it is furthermore preferable in the safety telegram that in addition to the actual safe and therefore in particular safety-relevant useful data to be transmitted even all redundant information necessary for a safe transmission such as, e.g., an unambiguous identification, running numbers, timestamp or CRC's are transmitted, wherein the conversion of error-recognizing measures and advantageously also safeguarding measures against errors can take place either exclusively in the producer and the consumer or only in the consumer, depending on the construction. Errors during writing in the data memory, during reading from the data memory and/or in the transmission to and from the data memory can therefore furthermore be safely recognized by a suitably superposed safety protocol, not only when using a bidirectional, safe communication relationship between the transmitter in the receiver but also when de facto there is no longer any bidirectional, safe communication relationship.

Therefore, since the data memory/server does not have to be safety-oriented, as a consequence, even standard data memories/servers can be used and/or when using cloud technologies both public as well as also private clouds can be used.

Therefore, the safe communication between safe producer and safe consumer does not come about according to the invention by the customary transmission of telegrams between producer and consumer but rather by a producer-side writing to a remote data memory and a consumer-side reading of this remote data memory.

As concerns a safe communication according to the invention via a data memory, in FIG. 1, e.g., a safe message "SPDU" (in English "Session Protocol Data Unit") is generated in the safe transmitter 1 as a safe producer and is written via a constructed write access connection "write_data" to the data memory 3. This can be a memory on a non-safe server but also a cloud computing infrastructure or some other file system. The safe receiver 2 as a safe consumer reads this memory out and therefore indirectly receives the safe message "SPDU". Although the safe message ran indirectly via a remotely located data memory, a "communication connection 4" is logically created between the safe transmitter 1 and the safe receiver 2. The safe transmitter 1 and the safe receiver 2 can be connected here, as sketched, to the same network infrastructure NI1, not shown in detail for reasons of clarity, or also to different network infrastructures.

As a modification to this exemplary embodiment, e.g., a modular machine can be composed of machine modules from different manufacturers. Inside the individual machine modules the safety function is converted locally by the customary safety systems, e.g., by a safety control and/or centrally or decentrally. Then, these different machine modules cooperating with each other as producers and consumers can then be connected in the framework of the invention, depending on the specific construction, as network subscribers to a common network infrastructure or to different network infrastructures.

The safe communication overlapping the machines in accordance with the invention is then realized, e.g., in that a machine module as a safe producer of safe data is the safe transmitter 1 which then files them, e.g., in the form of objects via OPC UA in the data memory 3 on a standard server UA and the receiver 2 is therefore a safe consumer of this safe data which receives this data by reading out the OPC UA objects and can subsequently consume them. The "OPC unified architecture", abbreviated OPC UA as an industrial machine-to-machine, abbreviated M2M, communication protocol is characterized by the ability of not only transporting machine data (process values, measuring values, parameters, etc.) but also of semantically describing them in a machine-reasonable manner. The safe data filed in the data memory on the server for its part advantageously contains redundant information such as unambiguous identifiers and, e.g., CRC, running numbers, timestamps, etc. in order that at least the receiver 2 reading the objects can safely recognize all errors in this indirect transmission via a data server.

In the case of an exemplary embodiment according to FIG. 2 concerning a safe communication between two safety devices of two separate network infrastructures NI1 and NI2 via another network infrastructure, in particular the Internet, and in particular a cloud computing infrastructure (abbreviated and designated as cloud), a safe input module of an I/O device 12 (e.g., a modular, remote I/O device which can be designated as a "remote" IO station) generates safe data as a safe transmitter 13. The safe transmitter 13 is therefore a safe producer in the framework of the invention. The safe input module is connected via this IO station 12 to a first network infrastructure NI1 and is furthermore arranged to transmit this safe data to the safe receiver 23 of one which is, e.g., a safe output module of an I/O device 22 (e.g., a modular, remote I/O device which can also be designated as a "remote" IO station) which is connected to a second network infrastructure NI2. The safe receiver 23 is therefore in the framework of the invention a safe consumer. Here, the safe data is transmitted, in particular in a safety telegram, e.g., via a bus 11 of the first network infrastructure NI1 to a standard control connected to this network infrastructure as another first network subscriber 10. The coupling unit 10a is in this case therefore a unit of the standard control, wherein the framework of the invention also comprises the fact that this other first network subscriber 10 can be arranged and constructed by appropriate software with the coupling unit 10a. The latter constructs a write access connection to a server 3 by a first interface 10a' via an Internet connection to the cloud 5 in order to file the safe data in the safety telegram on the data memory 3 of a server. Independently of this, a standard control arranged with a coupling unit 20a as another, second network subscriber 20 (or the coupling unit as a unit of a correspondingly arranged standard control) of the second network infrastructure NI2 establishes a write access connection to the data memory 3 by the interface 20a' via an Internet connection to the cloud 5 in a preferably cyclical manner in order to request new data. If new, safe data of the safe transmitter 13 is written into the data memory 3, which data is intended for the safe receiver 23, the coupling unit 20a reads this data and transmits it, e.g., via a bus 21 of the second network infrastructure NI2 to the I/O device 22 which finally forwards the safe telegram to the safe receiver 23 arranged as a safe producer. Since in this exemplary embodiment at least one of the coupling units connected to the producer or the consumer in the framework of the invention, and according to FIG. 2 even both coupling units 10a and 20a are part of a standard network subscriber, it is apparent for a person skilled in the art that consequently the information used for the unambiguous identification of the communication path in the data transmission of safe data between the safe producer and the safe consumer of data must be suitably adapted at least partially for using at least one transmission protocol used for the transmission of data between the particular standard network subscriber and the data memory, i.e., for writing and reading. A concrete usage can be realized, e.g., based on a CODESYS (development environment "Controller Development System" for memory-programmable controls "SPS") project in which an SPC (English also: Programmable Logic Controller, "PLC") arranged as coupling unit 10 receives safe data in a safety telegram from a safe input module 13 via the bus 11 of the first, in this case its own network infrastructure (e.g., Ethercat-based) and files this data in a "PLC cloud".

In a further modification of this exemplary embodiment, e.g., the coupling unit 20a can also be part of a standard control with Internet access to which a (e.g., second) network infrastructure of a local, closed network with safe subscribers (for example Safety Bridge) is connected. One of these subscribers is, e.g., a safety control (e.g., a safe-directed, digital output module of the "LPSDO" of the applicant) which also might consume data from another local network with another (e.g., first) network infrastructure from a safe input subscriber connected there (e.g., a safety-directed, digital input module of the "PSDI" of the applicant PSDI). The standard control of the other local network also has access to the Internet. The safety control of the one (or second) local, closed network is therefore in this case the safe producer and the safety control of the other (or first) local network is the safe consumer.

Both standard controls have access to the same data memory of a cloud or of a cloud computing infrastructure. Accordingly, in this case the standard control of the other (or first) local network is arranged and designed to write the data of the safe input subscriber PSDI into the data memory of the cloud via an appropriate write access connection and the standard control of the one (or second) network is arranged and designed for reading out this data as needed into transmitted to the LPSDO in the other (or first) local network.

Figure 3:
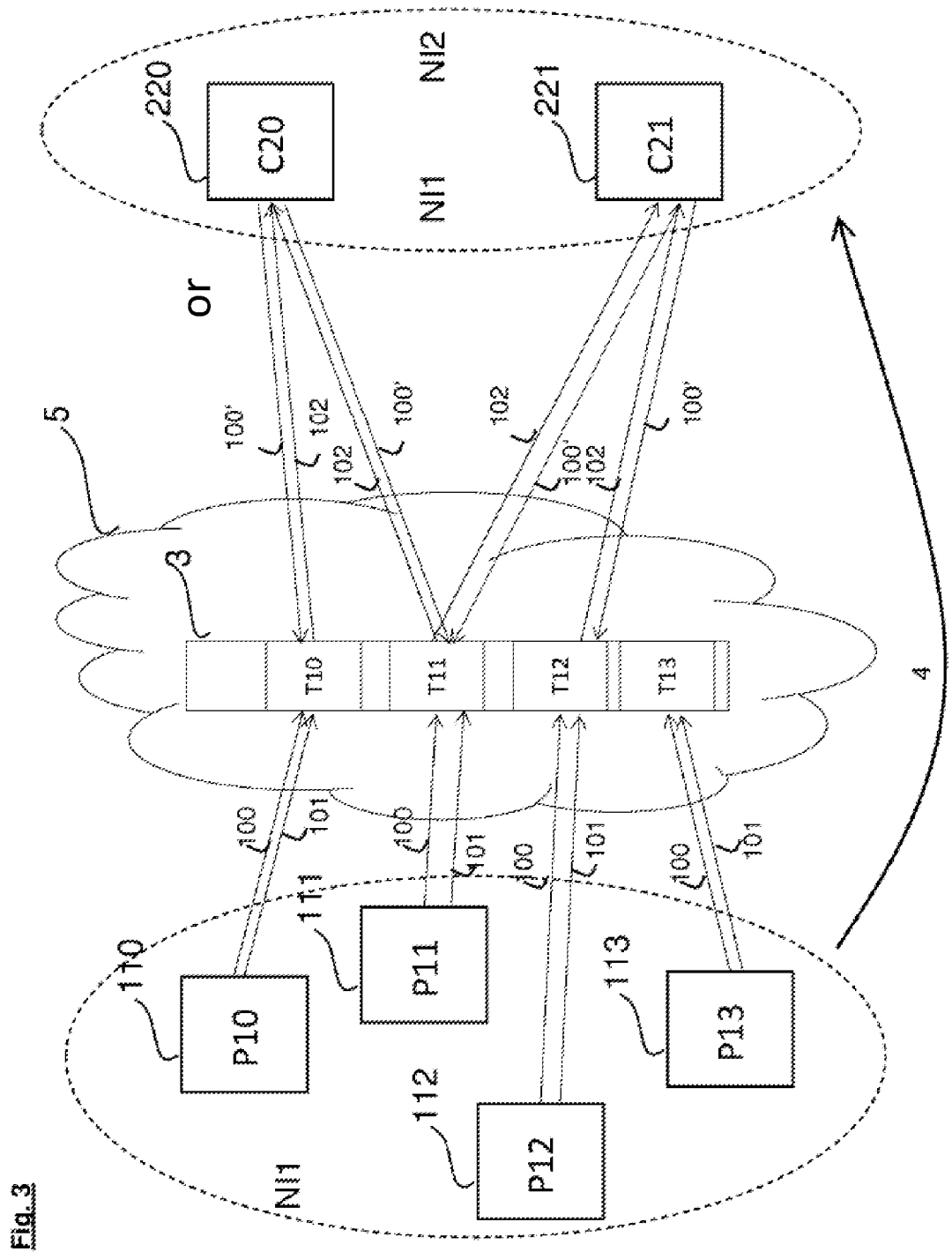
FIG. 3 shows a schematic view of a safe transmission from four safe producers to two safe consumers in which there is de facto no bidirectional, safe communication relationship.

Another exemplary embodiment according to FIG. 3 relates to a safe transmission of four safe producers P10, P11, P12, P13 to two safe consumers C20, C21 in which there is de facto no directional, safe communication relationship.

The safe producers P10, P11, P12 and P13 generate in this case safety-relevant data with no knowledge of and independently of whether it is ever consumed. The safe producers P10, P11, P12 and P13 are, e.g., part of a network subscriber 110, 111, 112 and 113 of a first network infrastructure ND which makes input data available or are constructed and arranged as such. The safety generated data from the safe producers P10, P11, P12 and P13, in particular safety-relevant data, is subsequently transmitted to a standard data memory 3, e.g., in a cloud 5 and is filed there on different, predetermined memory areas T10, T11, T12 or T13 given, i.e., for the producers P10, P11, P12 or P13 of the network subscriber 110, 111, 112 and 113 by appropriate identification information. Here, other coupling units comprised in a corresponding manner are not shown for reasons of clarity.

Two consumers C20 and C21 which are designed and arranged, e.g., as part of a network subscriber 220 and 221 further processing input data to output data or are designed and arranged as such a one read the data which is relevant for them and in particular only this data from the non-safe memory 3 and check via the contents and additional information the integrity of the data of the transmission. For the reading of this data from the standard data memory 3, e.g., write access is exclusively made to predetermined, i.e. given for the consumers C20 and C21 of the network subscribers 220 and 221) memory areas T10, T11, T12 or T13. If the consumer C20 (of the network subscriber 220) requires, e.g., the data from the producers P10 and P11 (of the network subscriber 110 and 111), in contrast to which consumer C21 (of the network subscriber 221) should consume the data from 110 and 120 from the producers P11 and P12 (of the network subscriber 111 and 112), these memory areas T10 and T11 or T11 or T12 for the data reading access are given by appropriate identification information so that it is ensured that only data from these predetermined memory areas is consumed. Here too, other coupling units comprised in a corresponding manner are not shown for reasons of clarity.

The data of the producer P13 (of the network subscriber 113) is therefore not consumed by any end device in this exemplary embodiment.

Furthermore, in this exemplary embodiment no safety-related evaluations of the success/failure of the sending of the safety telegram and associated air-safe reactions are to be performed by the producers. No response to them is necessary. All measures for the recognition of transmission errors, in particular also any error-safe reaction to recognized transmission errors are therefore preferably exclusively converted in the consumer C20 or C21 of the network subscriber 220 and/or 221. The safe producers P10, P11, P12 and P13 advantageously support the error-recognizing measures only by the error-safe generation of additional information necessary for the recognition of errors such as, e.g., safe (optionally unambiguous worldwide) identification of the generator, safe time stamp, safe continuous numbers and/or safe CRCs.

Figure 4:
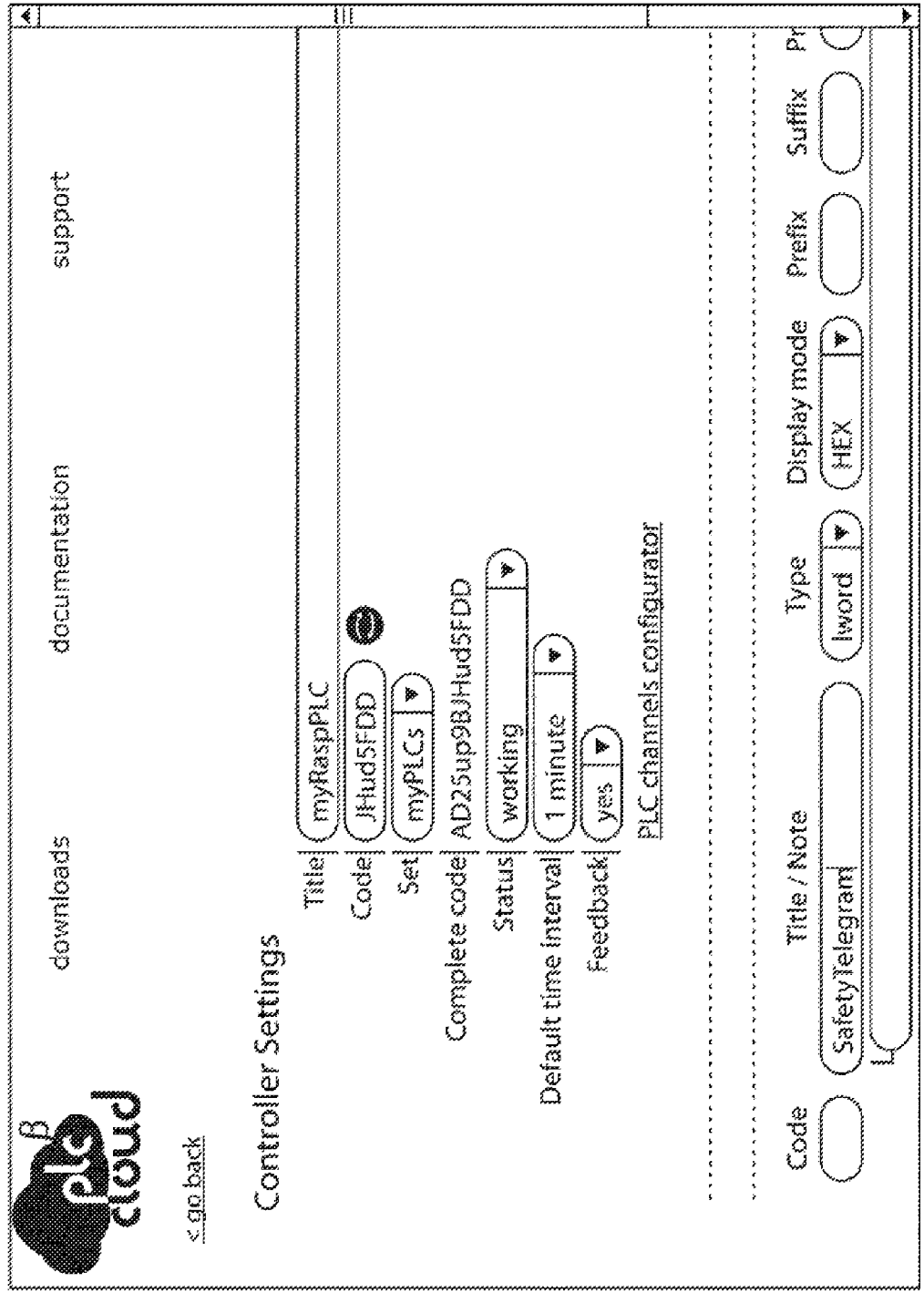
FIG. 4 shows a screenshot of a section of a configuration menu displayed on a monitor for adjusting the cloud parameters for a data set in the scope of the invention.

FIG. 4 shows an exemplary screenshot of the section of a configuration menu displayed on a monitor for setting the cloud parameters for a data record to be filed in the framework of the invention, e.g., for a data record to be filed in the memory area T10. Here, the safe producer P10 of the safe data is, e.g., a memory-programmable, safe control designated by "myRaspPLC". In the next lower level of the configuration menu, designated by "PLC channels configurator", e.g., the access data for the standard data memory 3 of cloud 5 and the determined memory area T10 for the filing of a generated data record can be given by a user. A active substance data record generated by the memory-programmable, safe control is, according to the example shown, a record of safe data of a safety telegram "SafetyTelegramms", which also contains in particular all additional information necessary for the safeguard measures for the error recognition and advantageously also for the safeguarding against errors, which information is used by a consumer, e.g., according to FIG. 3 by the consumer C20, of this safety telegram for a conversion of these measures.

It is apparent for a person skilled in the art that the configuration menu for setting the cloud parameters for a data record to be retrieved in the framework of the invention, e.g., for a filed data record to be consumed by the consumer C20 from the memory area T10, can keep ready appropriate possibilities of configuration.

It can furthermore be recognized by a person skilled in the art based on previous examples that other possible embodiments are possible in the framework of the invention such as, e.g., a safe communication between two safety controls via a cloud, a safe communication between a "cloud-capable" sensor and a safety control or a safe communication between a safety control and the digital image of a safe I/O device (simulation).

Furthermore, as a supplement to the above exemplary embodiments securing information can also be recorded in the access units and the access units arranged and designed, using the securing information, for initiating a secure transmission and in particular an encoded data transmission, especially with a cloud computing infrastructure. As a result, the security of the data transmission can be clearly raised. In particular, in this regard a so-called security certificate can be recorded or stored in a memory area of the access units. This security certificate can be issued, for example, by the provider of a cloud computing infrastructure. On the one hand, a coupling unit can be authenticated by such a security certificate and it can also be documented that it is authorized for a data transmission with the cloud computing infrastructure. The connection established for the transmission of data is then consequently secure. On the other hand, based on the security certificate an encoded data transmission can take place between the coupling unit and the cloud computing infrastructure. For example, TLS (English: transport layer security) can be provided here as a coding mechanism.

LIST OF REFERENCE NUMERALS 1, 13 Safe sender;
1a, 10a First coupling unit;
2, 23 Safe receiver;
2a, 20a Second coupling unit;
1a', 10a', 2a', 20a' Interface;
3 Data memory;
5 Cloud computing infrastructure;
10, 20 First, second network subscriber;
12, 22 I/O device;
11, 21 Local bus;
100 Write access;
101 Write;
100' Read access;
102 Read or retrieve;
110, 111, 112, 113 Network subscribers;
220, 221 Network subscribers;
P10, P11, P12, P13 Safe producers;
C20, C21 Safe consumers;
T10, T11, T12, T13 Memory areas;
NI1, NI2 First, second network infrastructure.

The invention claimed is:

1. A network system for the transmission of data between at least one safe producer of data and at least one safe consumer of data, wherein the safe producer is a network subscriber which is connected to a first network infrastructure and the safe consumer is a network subscriber which is connected to the first network infrastructure or to a second network infrastructure, and wherein at least one of these safe producers is arranged to generate data for at least one of these safe consumers, and at least one of these safe consumers is arranged for safely consuming data from at least one of these safe producers, comprising:
 a data memory to which data is written and from which data is read out; and
 at least one first coupling unit and at least one second coupling unit with at least one interface,
 wherein at least one of these safe producers, which is arranged to generate data for at least one of these safe consumers, is connected to such a first coupling unit and this first coupling unit is arranged and designed to write data generated by this safe producer into the data memory which data is identified as such by its interface by establishing at least one write access connection to the data memory,
 wherein at least one of these safe consumers which is arranged to consume data from at least one of the safe producers is connected to a second coupling unit and this second coupling unit is arranged and designed by its interface by constructing at least one read access connection to the data memory from this data of the safe producer which data is written in an identifiable manner in this data memory as determined for this safe consumer, and
 wherein safety mechanisms for converting error-recognizing measures are present exclusively in the at least one safe producer or the at least one safe consumer responsive to the at least one safe producer being configured to carry out evaluations of transmissions of the data.

2. The network system according to claim 1, wherein the safe producer is arranged to safely generate data for a predetermined safe consumer, and/or the first coupling unit connected to this safe producer is arranged to write data for a predetermined safe consumer into the data memory.

3. The network system according to claim 1 wherein the safe producer, that is arranged to safely generate data for at least one of these safe consumers, and to generate data independently from a certain safe consumer and/or the first coupling unit connected to the latter is arranged to write data independently of a certain safe consumer into the data memory.

4. The network system according to claim 1, wherein the safe consumer, that is arranged to safely consume data from at least one of these safe producers is arranged to consume data from a certain safe producer and/or the second coupling unit connected to the latter is arranged to read data from a certain safe producer.

5. The network system according to claim 1, wherein the first coupling unit is a unit of the safe producer or of a first other network subscriber that is connected to the first network infrastructure, and wherein the second coupling unit is a unit of the safe consumer or of a second, other network subscriber that is also connected to the network infrastructure of this safe consumer.

6. The network system according to claim 1, wherein the data memory is connected to the first network infrastructure, to the second network infrastructure or to a third network infrastructure.

7. The network system according to claim 1, wherein the data memory is connected to the Internet, and through the Internet to a cloud computing infrastructure.

8. The network system according to claim 1, wherein network subscribers transmit data within a network infrastructure according to a predefined communication protocol.

9. The network system according to claim 1, wherein the safe producer, which is arranged to generate data for at least one of these safe consumers, and the safe consumer, which is arranged for safely consuming data from at least one of these safe producers, are arranged and designed to use a common, predefined safety protocol for the transmission of data to be transmitted between this safe producer and this safe consumer, wherein the safety protocol, independently of the using of particular communication protocols between network subscribers is superposable on the latter.

10. The network system according to claim 1, wherein the conversion of error-recognizing measures and safeguarding measures against errors regarding data to be transmitted between the safe producer, which is arranged to generate data for at least one of these safe consumers and the safe consumer, which is arranged for safely consuming data from at least one of these safe producers, takes place exclusively in the safe consumer.

11. The network system according to claim 1, wherein at least one piece of predetermined identification information is recorded in the safe producer, which is arranged to generate data for at least one of these safe consumers, and/or in the coupling unit connected to the latter, and in the safe consumer, which is arranged to safely consume data from at least one of these safe producers and/or in the second coupling unit connected to the latter, which identification information is arranged and designed to perform at least the writing and reading using this at least one piece of identification information.

12. A method for operating a data transmission between at least one safe producer of safe data and at least one safe consumer of safe data, wherein this safe producer comprises a network subscriber connected to a first network infrastructure and the safe consumer comprises a network subscriber connected to one of the first network infrastructure or to a second network infrastructure, the method comprising the steps of:

generating safe data for a safe consumer by the safe producer, writing, by use of a write access to a data memory, the generated data, identifiable as such, into the data memory;

consuming safe data of at least one safe producer by at least one safe consumer, wherein a data memory accessed by reading a read access, into which certain data is written and identified for at least one of the safe consumers, and wherein the data which was written in as certain identifiable data for this at least one safe consumer is read, and wherein safety mechanisms for converting error-recognizing measures are present exclusively in the at least one safe producer or the at least one safe consumer responsive to the at least one safe producer being configured to carry out evaluations of transmissions of the safe data.

13. The method according to claim 12, further comprising the steps of:

safely generating, by the safe producer, data for a predetermined safe consumer; and writing, by a first coupling unit connected to the safe producer, data for a predetermined safe consumer into the data memory.

14. The method according to claim 12, further comprising the steps of:

safely generating, by the safe producer, data independently from a predetermined safe consumer; and writing, by a first coupling unit connected to the safe producer, data independently of a predetermined safe consumer into the data memory.

15. The method according to claim 12, further comprising the steps of:

reading, by a second coupling unit coupled to the safe consumer, data from a predetermined safe producer.

16. The method according to claim 12, wherein the first coupling unit is a unit of: one of a safe producer or of a first other network subscriber connected to the first network infrastructure, and wherein the second coupling unit is a unit of one of a safe consumer or of a second network subscriber that is also connected to the network infrastructure of the safe consumer.

17. The method according to claim 12, wherein the data memory is connected to one of: the first network infrastructure, to the second network infrastructure or to a third network infrastructure.

18. The method according to claim 12, wherein the data memory is connected to the Internet, and through the Internet to a cloud computing infrastructure.

19. The method according to claim 12, further comprising the steps of:

transmitting data, by network subscribers, within a network infrastructure according to a predefined communication protocol.

* * * * *